(12) United States Patent
Klopfenstein et al.

(10) Patent No.: US 10,594,421 B2
(45) Date of Patent: Mar. 17, 2020

(54) METHOD AND APPARATUS FOR CONTROLLING A FILTER CIRCUIT IN A SIGNAL COMMUNICATION DEVICE

(71) Applicant: InterDigital CE Patent Holdings, Paris (FR)

(72) Inventors: Scott Edward Klopfenstein, Fishers, IN (US); Srinivasa Ramani, Indianapolis, IN (US); Harold Gene Roberts, Carmel, IN (US); Rejimon G. Varghese, Carmel, IN (US)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 15/749,602

(22) PCT Filed: Jun. 29, 2016

(86) PCT No.: PCT/US2016/040016
§ 371 (c)(1),
(2) Date: Feb. 1, 2018

(87) PCT Pub. No.: WO2017/030660
PCT Pub. Date: Feb. 23, 2017

(65) Prior Publication Data
US 2018/0234196 A1   Aug. 16, 2018

Related U.S. Application Data

(60) Provisional application No. 62/206,370, filed on Aug. 18, 2015.

(51) Int. Cl.
*H03H 7/46* (2006.01)
*H04J 1/12* (2006.01)
(Continued)

(52) U.S. Cl.
CPC .............. *H04J 1/12* (2013.01); *H04L 5/0094* (2013.01); *H04L 5/06* (2013.01); *H04L 5/143* (2013.01);
(Continued)

(58) Field of Classification Search
USPC ....... 370/229, 230, 252, 278, 281, 282, 295, 370/329; 333/132
See application file for complete search history.

(56) References Cited

U.S. PATENT DOCUMENTS 7,023,871 B2   4/2006   Lind et al.
7,162,731 B2   1/2007   Reidhead et al.
(Continued)

FOREIGN PATENT DOCUMENTS

CN   1830165         9/2006
CN   101841371       9/2010
EP   1838041 A1     9/2007

*Primary Examiner* — Kwang B Yao
*Assistant Examiner* — Nguyen H Ngo
(74) *Attorney, Agent, or Firm* — Jerome G. Schaefer; Miachael A. Pugel

(57) ABSTRACT

The present disclosure is directed to an apparatus (300) and method (400, 600) for controlling a filter circuit (500) in a signal communication device (300). The apparatus (300) and method (400, 600) of the present disclosure receives (410) an indication of a plurality of channels used to transmit upstream communication signals in an upstream communication portion of a frequency range. Furthermore, the apparatus (300) and method (400, 600) of the present disclosure determines (420) a maximum frequency value among all frequencies used by the plurality of channels based on the indication and adjusts (430) a filter response in a filter circuit (500) used to separate the upstream communication signals from the downstream communication signals in a communication device (300) based on the determined uppermost frequency value.

18 Claims, 6 Drawing Sheets

(51) Int. Cl.

| | | |
|---|---|---|
| *H04L 12/28* | (2006.01) | |
| *H04N 7/01* | (2006.01) | |
| *H04N 21/2385* | (2011.01) | |
| *H04N 21/437* | (2011.01) | |
| *H04N 21/647* | (2011.01) | |
| *H04N 7/10* | (2006.01) | |
| *H04L 5/00* | (2006.01) | |
| *H04L 5/06* | (2006.01) | |
| *H04L 5/14* | (2006.01) | |

(52) U.S. Cl.
 CPC ......... *H04L 12/2801* (2013.01); *H04N 7/014* (2013.01); *H04N 7/102* (2013.01); *H04N 21/2385* (2013.01); *H04N 21/437* (2013.01); *H04N 21/64753* (2013.01)

(56) References Cited

U.S. PATENT DOCUMENTS

| | | |
|---|---|---|
| 7,617,517 B2 | 11/2009 | Kay |
| 8,464,301 B2 | 6/2013 | Olson et al. |
| 8,832,767 B2 | 9/2014 | Olson et al. |
| 8,958,317 B2 * | 2/2015 | Ahn ...................... H04L 5/0007 370/252 |
| 9,595,765 B1 * | 3/2017 | Valayil ................... H01Q 13/18 |
| 2002/0115421 A1 * | 8/2002 | Shahar .................. H04L 5/1438 455/403 |
| 2003/0156691 A1 * | 8/2003 | Rahamim ................ H04B 3/32 379/93.28 |
| 2005/0078699 A1 | 4/2005 | Cummings |
| 2005/0084004 A1 | 4/2005 | Bione |
| 2005/0122996 A1 * | 6/2005 | Azenkot ............. H04L 12/2801 370/477 |
| 2009/0113510 A1 | 4/2009 | Knutson et al. |
| 2010/0100919 A1 * | 4/2010 | Hsue ................. H04L 12/2801 725/111 |
| 2010/0100921 A1 * | 4/2010 | Olson ................ H04L 12/2801 725/118 |
| 2012/0044361 A1 * | 2/2012 | Riggsby ................... H03H 7/48 348/192 |
| 2013/0148707 A1 | 6/2013 | Thibeault et al. |
| 2016/0323885 A1 * | 11/2016 | Kazmi ................... H04L 5/143 |
| 2017/0054423 A1 * | 2/2017 | Ariesen ................... H03F 3/62 |

* cited by examiner

METHOD AND APPARATUS FOR CONTROLLING A FILTER CIRCUIT IN A SIGNAL COMMUNICATION DEVICE

CROSS REFERENCE TO RELATED APPLICATIONS

This application claims the benefit, under 35 U.S.C. § 365 of International application PCT/US16/040016, filed on Jun. 29, 2016, which claims the benefit of and priority to the U.S. provisional application 62/206370, filed on Aug. 18, 2015. The PCT and U.S. applications are herein incorporated by reference in their entirety and for all purposes.

TECHNICAL FIELD

The present disclosure generally relates to communication systems, and more particularly, to a method and apparatus for controlling a filter circuit in a signal communication device.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Today, modems, such as cable modems, offer Internet connectivity to subscribers' homes. These modems are typically connected to an information distribution network, such as a coaxial cable network, an optical fiber network, a hybrid fiber/coaxial cable network, or a wireless network, and communicate with a network device outside the home (e.g., a termination system, such as a cable modem termination server (CMTS)). Within the home, the modem may be connected to an in-home network, such as an Ethernet network, an in-home coaxial cable network (e.g., per the Multimedia over Coax Alliance—(MoCA) specification), wireless network, etc., and various devices within the home may use that network to ultimately communicate with network devices outside the home. Additionally, the modem may provide telephone services to the home (e.g., Voice over IP (VoIP) services). Such multi-function modems are commonly referred to as a gateway or gateway device.

The communication protocol used in a cable network between the home device (e.g., cable modem or gateway) and the CMTS is referred to as Data over Cable Service Interface Specification (DOCSIS). The latest protocol that is available today is DOCSIS version 3.1 and, among other changes from earlier versions, expands the possible operating range for upstream communication. Previous versions of DOCSIS used an upstream frequency band from 5 Megahertz (MHz) to 42 MHz. All consumer premises equipment (CPE) devices in this network via settop boxes (STBs), Cable Modem, Cable Modem with integrated voice, router or Wi-Fi (Gateways) operate using upstream signaling within that frequency range.

However, due to expansion of the network capabilities and a need for higher bandwidth for the upstream communication, DOCSIS 3.1 allows for expanding the upstream frequency range from 5-42 MHz to 5-85 MHz. Future upgrades may expand the range further. However, not all networks may be upgraded at the same time. As a result, the new portion of the expanded upstream frequency range, from 42 MHz to 85 MHz, may still be used for downstream communications in some networks. In order to meet these two environments, service providers may deploy two different products using two different input filter circuits or diplexers, one for each environment. Alternatively, the network and service provider may temporarily remove the overlapping downstream communication signals for frequencies below 85 MHz in case they want to deploy a device including a single fixed 5-85 MHz upstream filter. These approaches are not optimal. Therefore, a need exists for a mechanism that allows a communication device, such as a modem or gateway device, to in either one of two network communication configurations and further includes the capability to control the configuration based on some determination of the network communication configuration.

SUMMARY

According to one aspect of the present disclosure, a method is provided including receiving an indication of a plurality of channels used to transmit upstream communication signals in an upstream communication portion of a frequency range, determining a maximum frequency value among all frequencies used by the plurality of channels based on the indication, and adjusting a filter response in a filter circuit used to separate the upstream communication signals from downstream communication signals in a communication device based on the determined maximum frequency.

According to another aspect of the present disclosure, an apparatus is provided that includes a network interface coupled to a network, the network interface including a filter circuit that separates signals communicated between the network and the apparatus in an upstream communication portion of a frequency range from signals communicated between the network and the apparatus in a downstream communication portion of the frequency range, the network interface further receiving an indication of a plurality of channels used to transmit upstream communication signals in the upstream communication portion of a frequency range, and a processing circuit coupled to the network interface, the processing circuit determining a maximum frequency value among all frequencies used by the plurality of channels in the upstream communication portion of the frequency range based on the indication in the received signal and adjusting a filter response in the filter circuit based on the determined maximum frequency.

BRIEF DESCRIPTION OF THE DRAWINGS

The above and other aspects, features, and advantages of the present disclosure will become more apparent in light of the following detailed description when taken in conjunction with the accompanying drawings in which.

Figure 1:
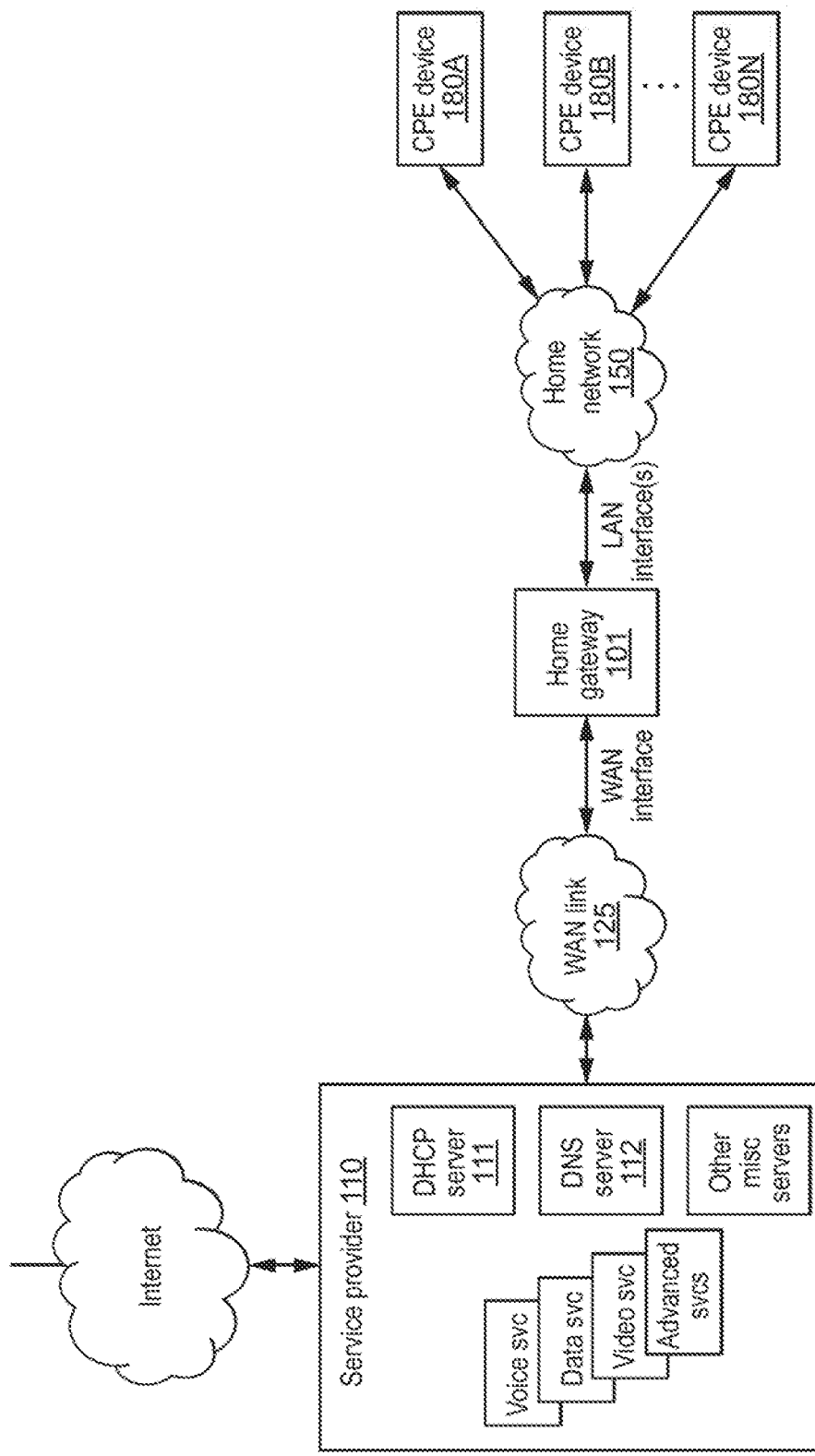
FIG. 1 is a block diagram of a networking communication system in accordance with an embodiment of the present disclosure.

It should be understood that the drawing(s) are for purposes of illustrating the concepts of the disclosure and is not necessarily the only possible configuration for illustrating the disclosure.

DETAILED DESCRIPTION

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions, Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative system components and/or circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "module" or "controller" should not be construed to refer exclusively to hardware capable of executing software, and may implicitly include, without limitation, a System on a Chip (SoC), digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the embodiments hereof, any element expressed or described as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure is directed to an apparatus and method for controlling a filter circuit in a signal communication device. Specifically, the embodiments describe an implementation that simplifies the operation of an upstream filter used in a cable modem or gateway device capable of operating using two different upstream frequency ranges, such as is used in a DOCSIS compliant cable network. A typical DOCSIS network may use a legacy 5-42 MHz upstream frequency or may use the new expanded 5-85 Mhz range (implemented in DOCSIS 3.1) and devices are usually configured to support one range or the other but not both in the same device. The present embodiments use a cost effective switchable diplexer/triplexer filter design that enables the device to operate on 5-42 MHz if the network is operating in this range and switch to 5-85 MHz range when needed without swapping the device or the software in the device. Furthermore, the embodiments describe a control mechanism that comprises a determination for the switching of the filter arrangement in the filter circuit of a signal communication device. As a result, the implementation can auto detect the filter option to select and operate using standard messages provided during communication with the device. The control mechanism looks for upstream channel descriptor (UCD) messages from the headend or cable modem termination server (CMTS) to determine the path of the flow control and network configuration (e.g., 5-42 MHz or 5-85 MHz). Depending on the UCD messages received the device can recognize the frequency range to be used and switch to the appropriate filter path and arrangement in the filtering circuit.

The present embodiments provide a solution to the upstream frequency range issues present with DOCSIS 3.1 network compatibility that is a low cost, modularized approach that can be easily integrated in to any DOCSIS network compatible communication device front end design. Further, the control mechanism requires no intervention by an operator or technician to change the filter configuration, is transparent to the user and network operator as to changing to a different filter operation mode, and requires no additional service provider assistance, (e.g., "truck rolls") to replace the device when the network operator wants to switch to different filter options. The control mechanism also utilizes some of the standard DOCSIS messaging (e.g., UCDs) for the determination and auto detection.

Although the embodiments describe the present disclosure operating as part of a gateway device used in a DOCSIS network, other embodiments may easily be adapted by one skilled in the art based on the teachings of one or more aspects of the present disclosure. For example, the present disclosure may include in other network connected devices including, but not limited to, access points, cable modems, and settop boxes. Further, with some modifications, aspects of the present disclosure may be adapted to operate with different frequency ranges, more than two frequency ranges and on alternative communication networks including, but not limited to satellite networks, wireless or terrestrial networks, and fiber or digital subscriber line (DSL) networks.

Turning to FIG. 1, a block diagram of a typical arrangement for a networking communication system 100 according to aspects of the present disclosure is shown. According to an exemplary embodiment, home gateway 101 is an advanced cable gateway, cable modem, DSL modem or the like, and is coupled to a wide area network (WAN) link 125 through a WAN interface to service provider 110. The WAN link 125 may be any one or more of the possible communication links including, but not limited to, coaxial cable, fiber optic cable, telephone line, or over the air (e.g., wireless or terrestrial) links. The home gateway 101 is also coupled via a local area network (LAN) interface to home network 150 which couples one or more customer premises equipment (CPE) devices 180A-N. The home network 150 preferably includes a wireless link but may also include wired links such as co-axial cable or Ethernet. CPE devices 180A-N may include, for example, personal computers, network printers, digital set-top boxes, and/or audio/visual media servers and players, among others.

Service provider 110 provides one or more services, such as voice, data, video and/or various advanced services, over WAN link 125 to CPE devices 180A-N through home gateway 101 and home network 150. Service provider 110 may include Internet related services and server structures such as a dynamic host configuration protocol (DHCP) server 111 and DNS server 112, and may include other servers and services as well (e.g., video on demand, news, weather). It is to be appreciated that these servers and services can be co-located or widely distributed, physically and/or virtually, in both hardware and software. It is contemplated that service provider 110 operates in a conventional manner in accordance with well-known protocols (e.g., DOCSIS). In an illustrative cable application, service provider 110 may be, for example, a cable multiple service operator (MSO).

Home gateway 101 acts as the interface between the WAN link 125 external to the customer's home and the home network 150 located in the customer's home. Home gateway 101 converts transport data packets, such as packets in an IP protocol, from a format used in the WAN to a format used in the home network or LAN. Home gateway 101 also routes data packets, including the converted data packets between the WAN and one or more devices on the home network. Home gateway 101 may include interfaces for both wired networking (e.g., Ethernet or Multimedia over Coaxial cable Alliance (MoCA)) and wireless networking. Home Gateway 101 allows data, voice, video and audio communication between the WAN and CPE devices 180A-N used in the customer's home, such as analog telephones, televisions, computers, and the like.

It is to be appreciated that in some configurations, the home gateway 101 may be partitioned into two separate devices coupled together in some communicative manner. The first device, connected to the WAN portion of the system, may be referred to as a cable modem or network termination device (NTD). The second device, connected to the home LAN portion of the system, may be referred to as a home router, a home server, or a home gateway. Functionally, and as will be described below, the two devices operate in a manner consistent with the home gateway 101.

Figure 2:
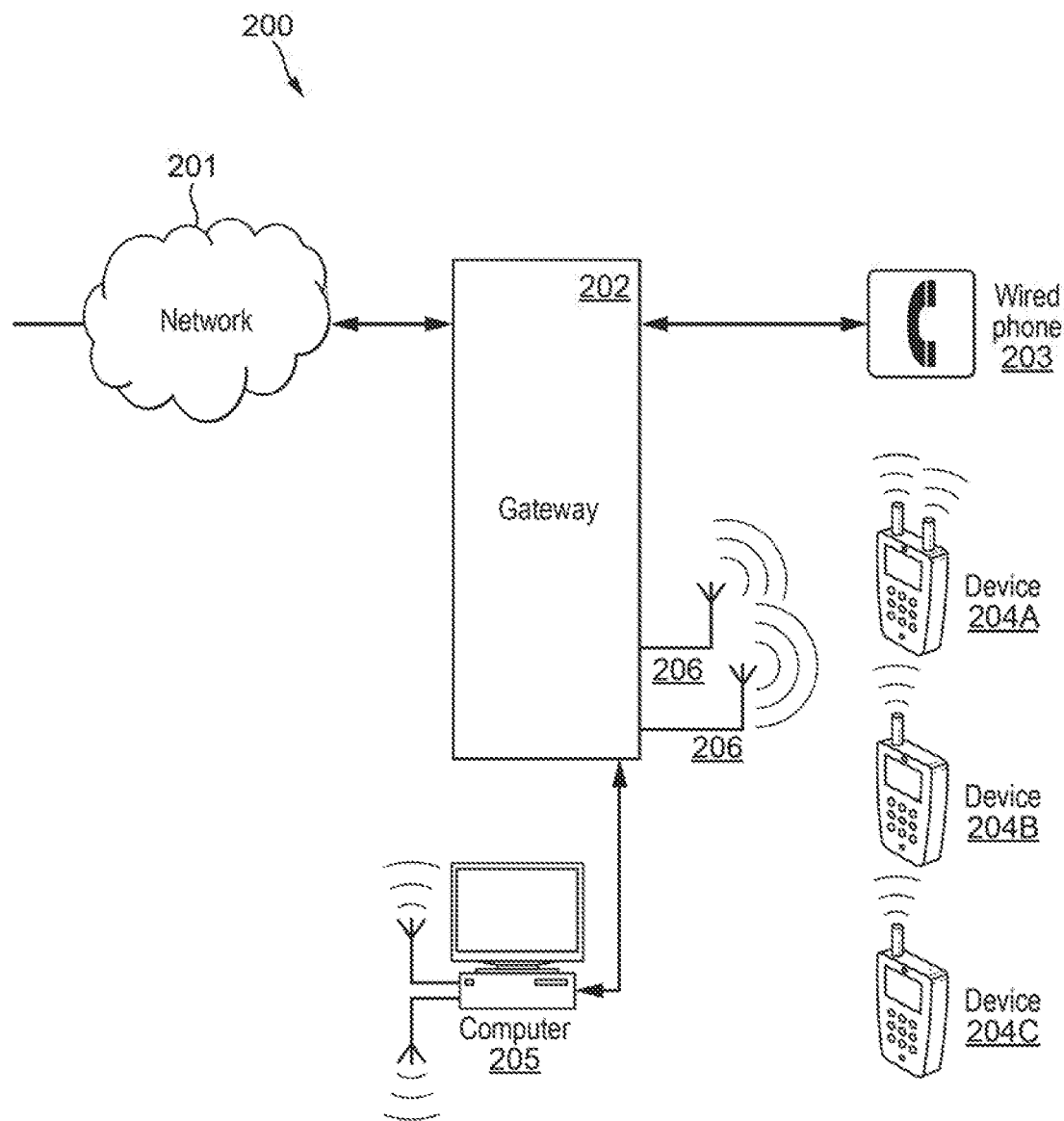
FIG. 2 is a block diagram of a gateway system in accordance with an embodiment of the present disclosure.

FIG. 2 shows a gateway system 200 according to aspects of the present disclosure. Gateway system 200 operates in a manner similar to networking communication system 100 described in FIG. 1. In gateway system 200, network 201 is coupled to gateway 202. Gateway 202 connects to wired phone 203. Gateway 202 also connects to computer 205. In addition, gateway 202 interfaces with devices 204A-204O through a wireless interface using one or more antennas 206. Gateway 202 may also interface with computer 205 using the one or more antennas 206.

In particular, gateway system 200 operates as part of a cable network interface and acts to interface a packet data cable system to one or more home networks. Gateway System 200 includes a gateway 202 that provides the interface between the network 201, operating as a WAN, and the home network(s). Gateway system 200 also includes wired analog telephone device 203 capable of operating as a home telephone when connected through gateway 202. In addition, gateway 202 also acts to provide a radio frequency (RF) interface to multiple wireless devices 204A, 204B, and 204O. Wireless device 204A, 204B, and 204O are handheld devices that operate at frequencies above 1.7 GHz using wireless packet transmissions via one or more antennas 206 on gateway 202. In other embodiments, other devices with wireless interfaces including, but not limited to routers, tablets, settop boxes, televisions, and media players may be used.

The wireless interface included in gateway 202 may also accommodate one or more wireless formats including Wi-Fi. Institute of Electrical and Electronics Engineers standard IEEE 802.11 or other similar wireless communication protocols. Further, it is to be appreciated that each antenna in the system may be attached to a separate transceiver circuit. As shown in FIG. 2, gateway 202 includes two antennas. Device 204A and computer 205 also include two transceiver circuits and two antennas while device 204B and device 204C include only one transmit receive circuit and one antenna. In some alternate designs, it may be possible that more than one antenna may be included with, and used by, a single transceiver circuit.

In operation, gateway 202 provides Internet Protocol (IP) services (e.g., data, voice, video, and/or audio) between devices 204A-C and Internet destinations identified and connected via network 201. Gateway 202 also provides IP voice services between wired phone 203 and call destinations routed through network 201. Gateway 202 further provides connectivity to a local computer 205 either via a wired connection such as is shown in FIG. 2 or via a wireless connection through one or more antennas and transceiver circuits. Thus, example interfaces for computer 205 include Ethernet and IEEE 802.11. As noted above, gateway 202 may physically be configured as two components, a cable modem or NTD that connects to network 201 and a home gateway that connects to all other devices in the home.

Gateway 202 further includes a communication front end circuit for interfacing with the head end or CMTS through the network 201. In some embodiments, the gateway 202 further includes circuitry for communicating in the home network or LAN using MoCA protocols over a co-axial cable. The communication front end circuit includes a diplexer filter, or a triplexer filter if MoCA is included, for separating the upstream communication and downstream communication signals (as well as MoCA signals if present), Further details regarding the implementation of the diplexer/ triplexer filter in accordance with the present disclosure will be described below. Further, the embodiment described herein primarily is used in a cable system, and more particularly, is used in a system using DOCSIS 3.1 protocols. It is likely that the present embodiments will also be useful in future advancement of the cable data protocols. As such, the present disclosure may be primarily used in a gateway that employs data modem functionality. However, other devices, including any other network connected device (e.g., cable modem, access point, etc.) that includes data modem circuitry and functionality or any other form of two communication functionality may also include aspects of the present disclosure.

Figure 3:
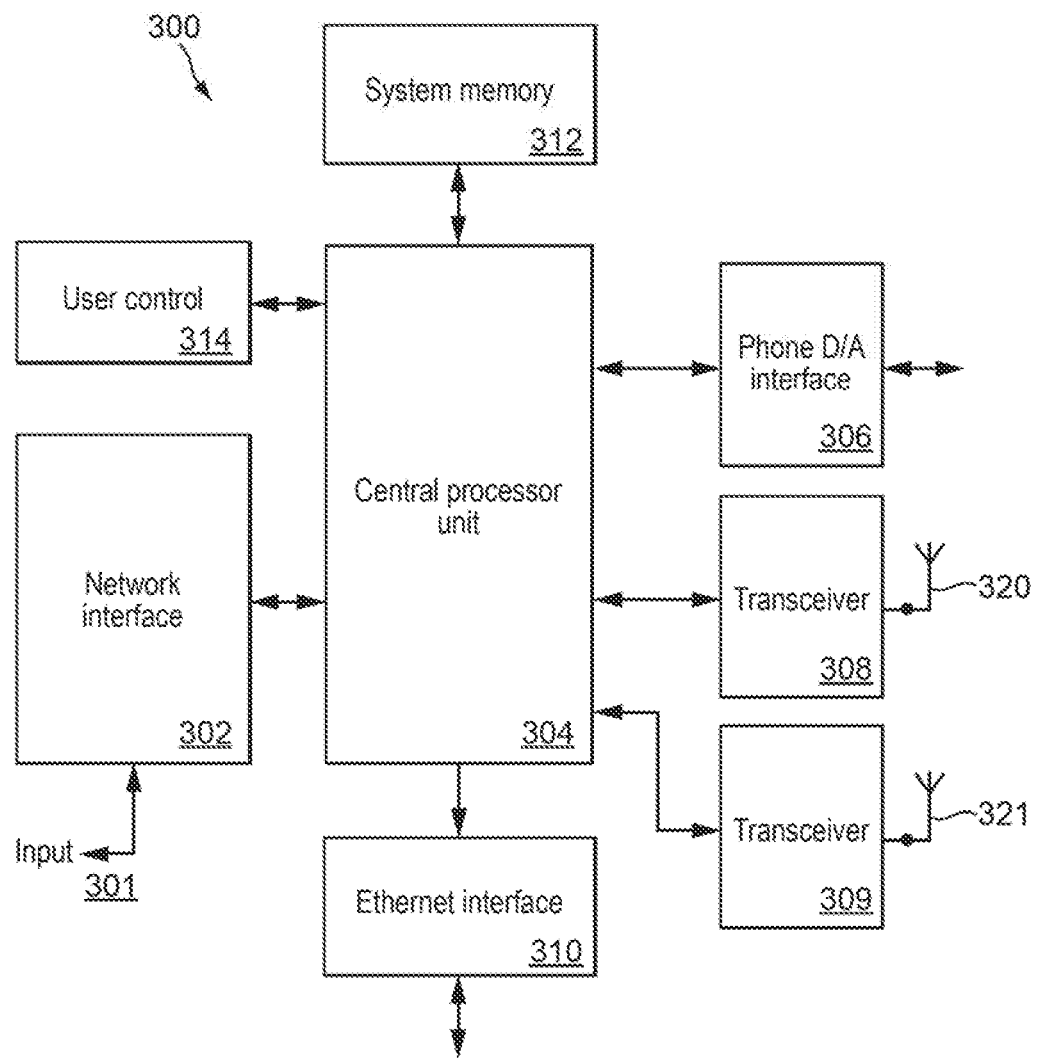
FIG. 3 is a block diagram of an exemplary gateway device in accordance with an embodiment of the present disclosure.

Turning to FIG. 3, a block diagram of an exemplary gateway device 300 according to aspects of the present disclosure is shown. Gateway device 300 may correspond to gateway 202 described in FIG. 2 or to home gateway 101 described in FIG. 1. In gateway device 300, an input signal is provided to RF input 301. RF input 301 connects to network interface 302. Network interface 302 connects to central processor unit (CPU) 304, e.g., a processor, controller, etc. CPU 304 connects to phone D/A interface 306, transceiver 308, transceiver 309, Ethernet interface 310, system memory 312, and user control 314. Transceiver 308 further connects to antenna 320. Transceiver 309 further connects to antenna 321. It is to be appreciated that several components and interconnections necessary for complete operation of gateway device 300 are not shown in the interest of conciseness, as the components not shown are well known to those skilled in the art. Gateway device 300 may be capable of operating as an interface to a cable or DSL communication network and further may be capable of providing an interface to one or more devices connected through either a wired and wireless home network.

A signal, such as a cable or DSL signal on the WAN, is interfaced to network interface 302 through RF input 301. Network interface 302 includes circuitry or one or more circuits to perform RF modulation and transmission functions on a signal provided to the WAN and tuning and demodulation functions on a signal received from the WAN. The RF modulation and demodulation functions are the same as those commonly used in communication systems, such as cable or DSL systems. It is important to note that in some embodiments, the network interface 302 may be referred to as a tuner even though the tuner may also include modulation and transmission circuitry and functionality.

CPU 304 accepts the demodulated cable or DSL signals and digitally processes interfaces in gateway 300 for delivery to network interface 302 and transmission to the WAN.

System memory 312 supports the processing and IP functions in CPU 304 and also serves as storage for program and data information. Processed and/or stored digital data from CPU 304 is available for transfer to and from Ethernet interface 310. Ethernet interface may support a typical Registered Jack (RJ) type RJ-45 physical interface connector or other standard interface connector and allow connection to an external local computer. Processed and/or stored digital data from CPU 304 is also available for digital to analog conversion in interface 306. Interface 306 allows connection to an analog telephone handset. Typically, this physical connection is provided via an RJ-11 standard interface, but other interface standards may be used. Processed and/or stored digital data from CPU 304 is additionally available for exchange with transceiver 308 and transceiver 309. Transceiver 308 and transceiver 309 can both support multiple operations and networked devices simultaneously. CPU 304 is also operative to receive and process user input signals provided via a user control interface 314, which may include a display and/or a user input device such as a hand-held remote control and/or other type of user input device.

As noted above, the gateway device 300 may be configured to operate as an NTD. In this case, CPU 304 may only connect to Ethernet interface 310 and system memory 312. Phone D/A interface 306, transceiver 308 and/or transceiver 309 may not be present or used. Further, an NTD may not include a direct user interface and as such may not include user control 314. Additionally, the NTD may include and support more than one Ethernet interface 310 and may be capable of operating each Ethernet interface as a separate virtual circuit between the content service provider(s) and the home gateway attached to the Ethernet interface, thus allowing the creation of separate LANs for each content consumer.

Network interface 302 may include a filter circuit including a plurality of filters. The filter circuit may include one or more low pass filters and high pass filters for filtering or separating the frequency ranges used for upstream and downstream communication in the WAN (e.g., as part of DOCSIS protocol) as well as signals in the frequency range used for MoCA communications in the home network. The filtering circuit in network interface 302 includes low pass and high pass filters that are coupled together and includes a switching arrangement to provide for reconfiguration of the filter circuit to support at least one of two possible upstream network configurations. In one embodiment, the filter circuit can be configured in a first arrangement to support a first network configuration, where upstream communication in the first network configuration occurs in the 5-42 MHz frequency range, and a second arrangement to support a second network configuration, where upstream communication in the second network configuration occurs in the 5-85 MHz frequency range. It is to be appreciated that above described frequency ranges are merely exemplary and that the filter circuit of the present disclosure can be adapted for switching between many different upstream communication frequency ranges to accommodate other existing and/or future contemplated protocols including different frequency ranges. One embodiment of a filter circuit will be described below in relation to FIG. 5.

Furthermore, CPU 304 interfaces with network interface 302 to determine or auto detect the network configuration currently employed by the service provider 110. After CPU 304 determines the network configuration currently employed by the service provider 110, CPU 304 can then switch between different filter arrangements for the filter circuit in network interface 302 to adjust the filtering response of the filtering circuit based on the determined network configuration. It is to be appreciated that the network configuration can be determined by CPU 304 by receiving an indication of the upstream channel being used in the upstream frequency communication range, where the indication is received on the downstream communication portion of the network. In one embodiment, CPU 304 determines the network configuration currently employed by the service provider 110 by gathering UCD's transmitted from the CMTS (via WAN link 125 or network 201) by the service provider 110 on a downstream channel and received by gateway 300 via input 301 and network interface 302, as will be described in greater detail below.

It is to be appreciated that when gateway 300 is first powered on and the boot-up state is initialized, the gateway 300 will tune to the last used downstream channel to gather UCD's. However, if there is no last used channel, gateway 300 will tune to each available channel until gateway 300 finds a downstream channel that is transmitting UCD's. It is to be appreciated that each downstream channel transmits all the UCDs. Furthermore, the total number of UCDs that will be transmitted is part of the data included in each UCD. In this way, when the gateway 300 can receive all the UCDs by tuning to a single downstream channel, the gateway 300 can determine the amount of UCDs that will be sent by the data in the UCDs.

It also is to be appreciated that the determination of the network configuration occurs before the "ranging" of the device (e.g., gateway 300) has begun. Ranging is a process in which a gateway or modem, such as gateway 300, begins sending a Range-Request (RNG-REQ) at the gateway's lowest transmit power (e.g., 8 decibels referenced to one millivolt (dBmV) for DOCSIS 2.0 and 1.x modems and typically 23 dBmV for DOCSIS 3.0 modems). If the gateway 300 does not receive a Range-Response (RNG-RSP) from the CMTS within 200 msec, the gateway 300 increases its transmit power by 3 dB and retransmits the RNG-REQ. During ranging, gateway 300 will continue to increase its transmit power until a RNG-RSP is received by the gateway 300.

It is to be appreciated that the determination for setting the filter arrangement in the filter circuit in network interface 302 through switching is performed at the proper time. If the determination for setting the filter arrangement through switching is performed too soon, then some possible UCDs may not be included in the determination, and therefore, possibly the wrong filter arrangement will be selected by CPU 304. If the determination to switch is done too late (e.g., during ranging), then some upstream channels (e.g., those in the frequency range between 42 and 65 MHz) may not properly operate.

Figure 4:
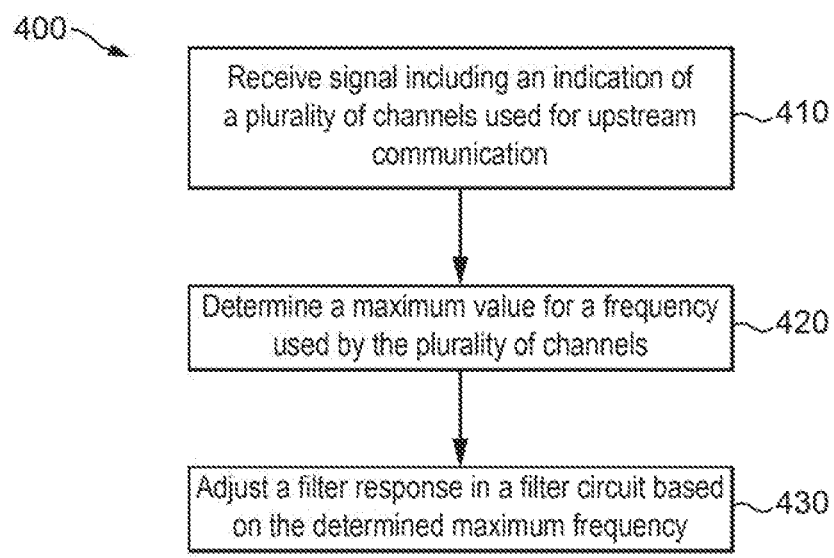
FIG. 4 is a flowchart of a method for adjusting a filter response in a filter circuit in accordance with an embodiment of the present disclosure.

Turning to FIG. 4, a flowchart of a method 400 for adjusting a filter response in a filter circuit included in a network interface circuit or tuner of a communication device, such as network interface 302 in gateway 300, is shown in accordance with the present disclosure. Initially, gateway 300 receives a signal (via input 301 and network interface 302) on a downstream channel including an indication of a plurality of channels used for upstream communication in an upstream communication portion of a frequency range, in step 410. In one embodiment, the indication received is a plurality of UCDs sent from the CMTS to the gateway 300 (as will be described in greater detail below), however other indications of the upstream channels being used are contemplated to be within the scope of the present disclosure. After receiving the signal including the indication, CPU 304 determines a maximum or uppermost value for a frequency used by the plurality of channels in the signal, in step 420. In one embodiment, the uppermost value for the frequency is determined based on the channel bandwidth and the symbol rate for the communication protocol for the channel (as will be described in greater detail below). Then, CPU 304 adjusts the filter response in the filter circuit of network interface 302 based on the determined uppermost frequency, in step 430. It is to be appreciated that the filter circuit will be described in greater detail below.

In one embodiment, the filter response is adjusted by CPU 304 by switching between a first filter arrangement configured for a first frequency range for upstream communication (e.g., approximately 5-42 MHz) and a second filter arrangement configured for a second frequency range for upstream communication (e.g., approximately 5-85 MHz). In this way the method 400 can be used with a communication device, such as gateway 300, to adapt to two or more differing network configurations. For example, one network configuration (e.g., previous versions of DOCSIS) may use a first frequency range for upstream communication and another network configuration (DOCSIS 3.1) may use a second frequency range for upstream communication, where the second frequency range expands the first frequency range.

Figure 5:
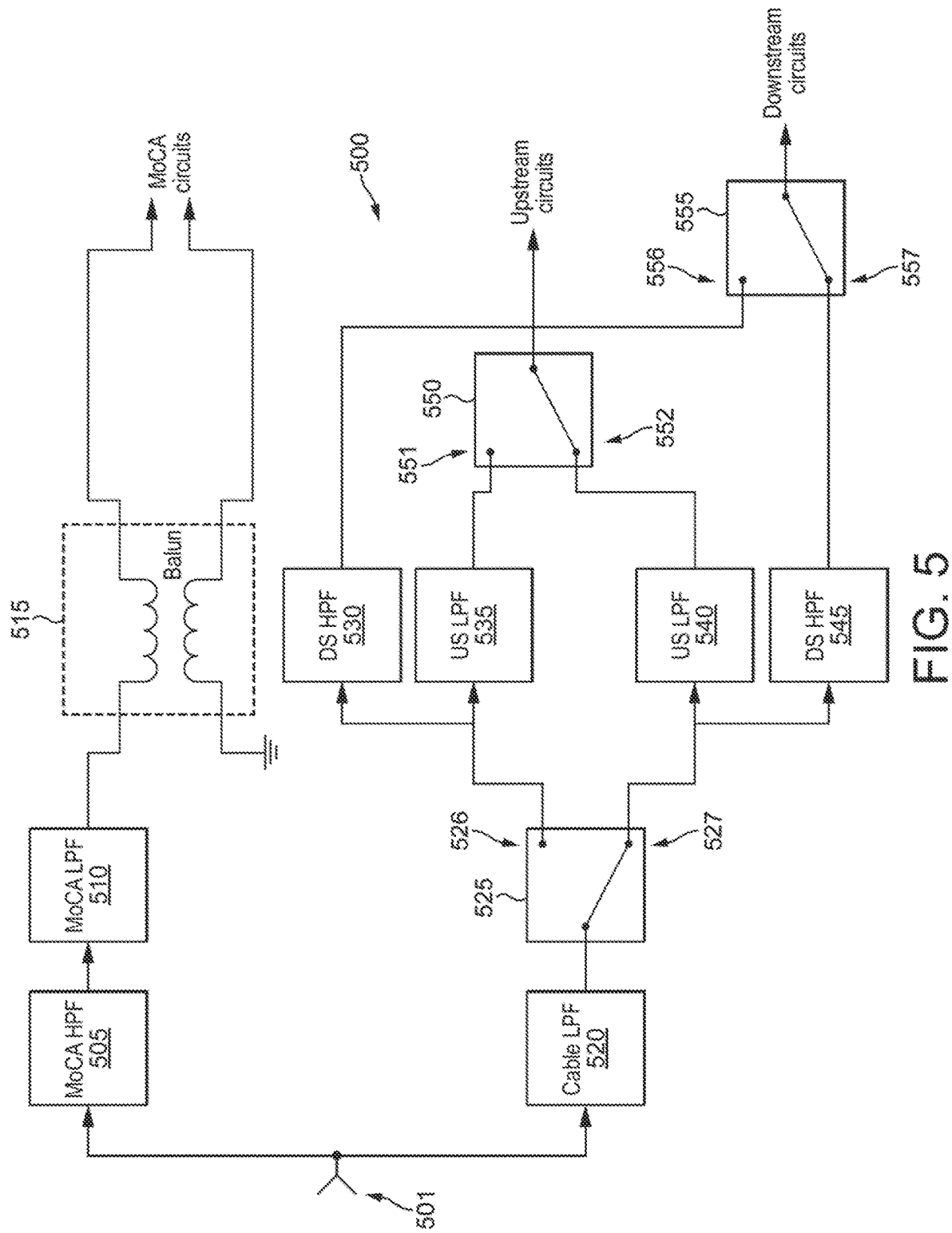
FIG. 5 is a block diagram of a filter circuit in accordance with an embodiment of the present disclosure.

Turning to FIG. 5, a block diagram of an exemplary filter circuit 500 for use in a gateway device operating in a DOCSIS network is shown. Filter circuit 500 may typically be used as part of a network interface circuit, such as network interface 302 described in FIG. 3. Filter circuit 500 may also be a separate component coupled to a tuner and demodulator for downstream communication as well as a transmitter for upstream communication. Although filter circuit 500 is described as being used in a DOCSIS network, in other embodiments, circuit 500 may be configured for use in other networks employing network configurations with differing upstream frequency ranges.

In filter circuit 500, a filter input 501 is coupled to high pass filter (HPF) 505, where HPF 505 is coupled to low pass filter (LPF) 510. It is to be appreciated that filter input 501 may be the same as input 301. In one embodiment, the filter passband corner frequencies for HPF 505 and LPF 510 are approximately 1,125 MHz and 1,675 MHz, respectively. LFP 510 is coupled to an input of balun 515, where the other input of balun 515 is coupled to ground, Each output of balun 515 is coupled to MoCA circuitry as used in a device, such as gateway 300 (not shown). High pass filter (HPF) 505, low pass filter (LPF) 510 and balun 515 provide a filtered signal path for MoCA operation between the filter input 501 and additional MoCA processing circuits (e.g., in network interface 302 or CPU 304).

The filter input 501 is also coupled to LPF 520. LPF 520 provides signal separation between the MoCA signal and the DOCSIS signal. In one embodiment, the filter passband corner frequency for LPF 520 is 1,002 MHz, LPF 520 is coupled to switch 525, for example as a single pole, double throw switch. Switch 525 includes two switchable outputs, output 526 and output 527. Output 526 is coupled to downstream (DS) HPF 530 and upstream (US) LPF 535. Output 527 is coupled to US LPF 540 and DS HPF 545. The outputs of US LPF 535 and US LPF 540 are coupled to the switchable inputs of switch 550, where US LPF 535 is coupled to input 551 and US LPF 540 is coupled to input 552, The outputs of DS HPF 530 and DS HPF 545 are coupled to the switchable inputs of switch 555, where DS HPF 530 is coupled to input 556 and DS HPF 545 is coupled to input 557. It is to be appreciated that switches 550 and 555 are shown as single pole, double throw switches, however, other switching arrangements and/or devices are contemplated to be within the scope of the present disclosure. The output of switch 555 provides a connection point for additional downstream circuitry (e.g., in network interface 302 or CPU 304) and the output of switch 550 provides a connection point for additional upstream circuitry (e.g., in network interface 302 or CPU 304) in gateway 300.

Each of switches 525, 550, and 555 include a control input (not shown) in order to provide operational switching control to the switches. The control input may be one or more signals provided to each one or all of the switches and may be generated and provided by a main control unit (e,g., CPU 304). For example, CPU 304 may provide one or more signals to switch 525 to couple LPF 520 to DS HPF 530 and US LPF 535 via output 526, or alternatively, to couple LPF 520 to US LPF 540 and DS HPF 545 via output 527. CPU 304 may further provide one or more signals to switch 550 to couple US LPF 535 to upstream circuitry in gateway 300 via input 551, or alternatively, to couple US LPF 540 to upstream circuitry in gateway 300 via input 552. CPU 304 may further provide one or more signals to switch 555 to couple DS HPS 530 to downstream circuitry in gateway 300 via input 556, or alternatively, to couple DS HPF 545 to downstream circuitry in gateway 300 via input 557.

The filter arrangements of the DS HPF 530/US LPF 535 (i,e, a first filter arrangement) and US LPF 540/DS HPF 545 (i.e., a second filter arrangement) allows for CPU 304 to switch to a filter arrangement that accommodates one of two possible upstream communication frequency ranges while also assuring minimal interaction between the filter elements that are connected together at common interfaces, For example, in one embodiment, the filter arrangements of the DS HPF 530/US LPF 535 and US LPF 540/DS HPF 545 are configured to allow CPU 304 to switch to the DS HPF 530/US LPF 535 filter arrangement if an older DOCSIS protocol (i.e., protocols before DOCSIS 3.1) using the 5-42 MHZ range for upstream communications is currently being used by a service provider 110 over a WAN. It is to be appreciated that in embodiments intended for use in networks using DOCSIS protocols, the filter passband corner frequencies for US LPF 535 and DS HPF 530 are 42 MHz and 54 MHz, respectively, while the filter passband corner frequencies for DS HPF 545 and US LPF 540 are 108 MHz and 85 MHz, respectively.

Referring again to FIG. 5, if, based on UCDs sent by CMTS to gateway 300 via the WAN and provided to CPU 304 via network interface 302, CPU 304 determines that upstream communication is occurring in the 5-42 MHz frequency range, CPU 304 can provide a signal to switch 525 to couple LPF 520 to DS HPF 530 and US LPF 535 via output 526 of switch 525. Furthermore, CPU 304 can provide a signal to switch 550 to couple US LPF 535 to upstream circuitry in gateway 300 via input 551 of switch 550 and CPU 304 can provide a signal to switch 555 to couple DS HPF 530 to downstream circuity in gateway 300 via input 556 of switch 555. The signals sent by CPU 304 to switches 525, 550, and 555 result in a first filter arrangement, where signals are provided to DS HP 530 and UP LPF 535 instead of US LPF 540 and DS HPF 545 (i.e., the second filter arrangement). In this way, signals received via input 501 and filtered in LPF 520 (i.e., signals below 1002 MHz) are provided to DS HPF 530 and US LPF 535. DS HPF 530 will only pass signals above 54 MHz and provide the signals above 54 MHz to downstream circuitry in gateway 300 via input 556 of switch 555. US LPF 535 will only pass signals below 42 MHz to upstream circuitry in gateway 300 via input 551 of switch 550.

Figure 6:
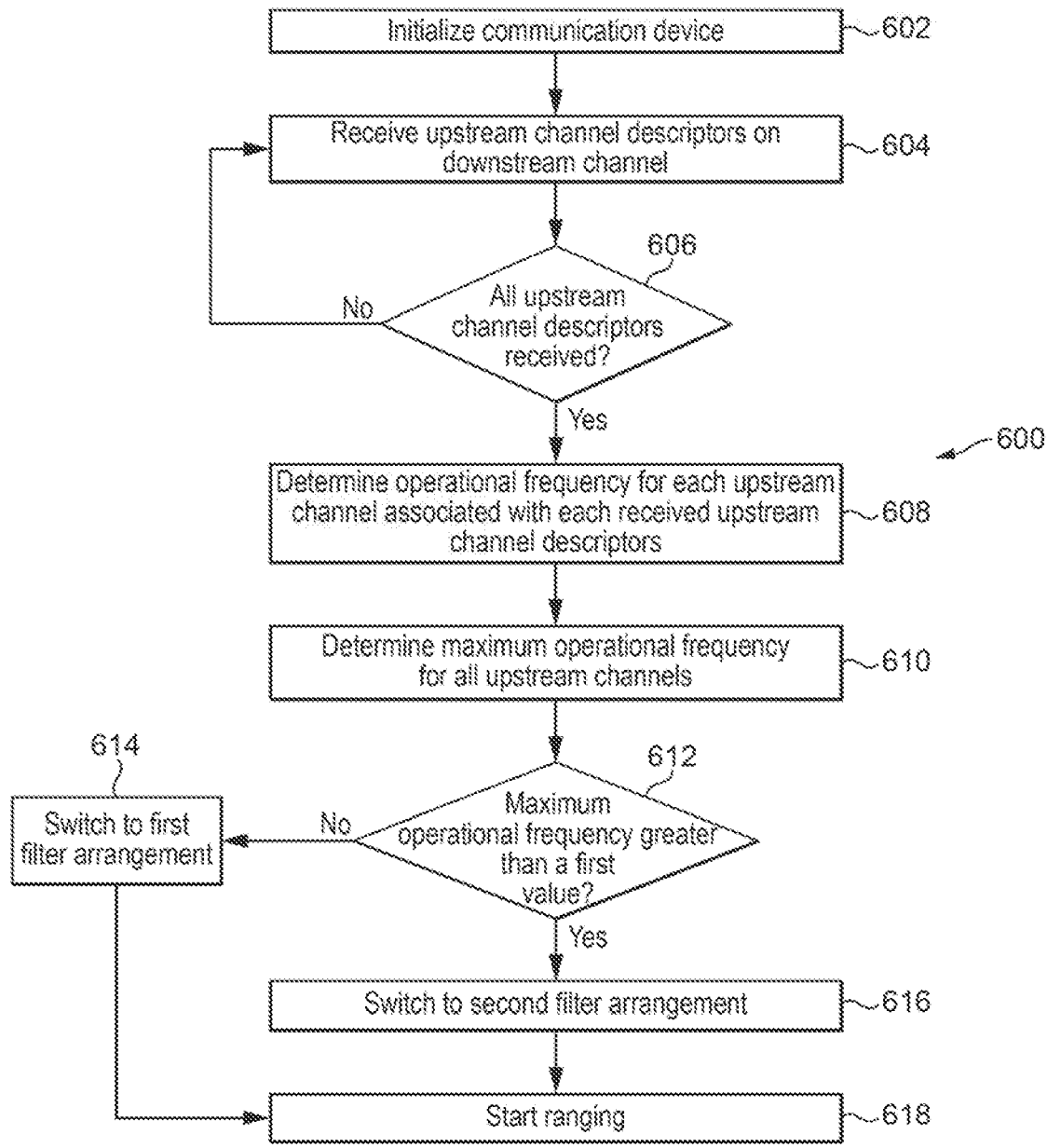
FIG. 6 is a flowchart of a method for controlling a filter circuit in a communication device in accordance with an embodiment of the present disclosure.

Alternatively, if, based on UCDs sent by CMTS to gateway 300 via the WAN and provided to CPU 304 via network interface 302, CPU 304 determines that upstream communication is occurring in the 5-85 MHz frequency range (i.e., the DOCSIS 3.1 protocol is being used by the service provider), CPU 304 can provide a signal to switch 525 to coupled LPF 520 to US LPF 540 and DS HPF 545 via output 527 of switch 525. Furthermore, CPU 304 can provide a signal to switch 550 to couple US LPF 540 to upstream circuitry in gateway 300 via input 552 of switch 550 and CPU 304 can provide a signal to switch 555 to couple DS HPF 545 to downstream circuitry in gateway 300 via input 557 of switch 555. The signals sent by CPU 304 to switches 525, 550, and 555 result in a second filter arrangement, where signals are provided to US LPF 540 and DS HPF 545 instead of DS HPF 530 and US LPF 535 (i.e., the first filter arrangement). In this way, signals received by input 501 and filtered in LPF 520 (i.e., signals below 1002 MHz) are provided to US LPF 540 and DS HPF 545. US LPF 540 will only pass signals below 85 MHz to upstream circuitry in gateway 300 via input 552 of switch 550. DS HPF 545 will only pass signal above 108 MHz to downstream circuitry in gateway 300 via input 557 of switch 555, Turning to FIG. 6, a flow chart illustrating a method 600 for controlling a filtering circuit in a communication device, such as gateway 300, is shown in accordance with the present disclosure. The steps in process 600 provide one implementation for controlling the filtering circuit 500 in FIG. 5 based on receiving and identifying UCDs sent by the CMTS to the gateway 300 via the WAN during initialization of the downstream communication in gateway 300.

Initially, a communication device, such as gateway 300, is initialized and the boot-up phase begins, in step 602. When the gateway 300 is initialized, gateway 300 will tune to the last used downstream communication channel (or, alternatively, the first valid downstream communication channel found by gateway 300 if there is no last used downstream communication channel). It is to be appreciated that if the network configuration has been changed while the gateway 300 is already running, gateway 300 will be re-initialized and will tune to the last used downstream communication channel (or the first valid downstream communication channel found by gateway 300 if there is no last used downstream communication channel). As stated above, the CMTS transmits a plurality UCDs downstream to the gateway 300 over the WAN. The CMTS transmits each UCD at predetermined time intervals chosen by the CMTS, For example, the CMTS may send one UCD every two seconds. Each UCD corresponds to an upstream communication channel and includes information concerning the upstream communication channel associated with the UCD. The CMTS will send a UCD for each upstream communication channel included in the network being used. It is to be appreciated that all UCDs are transmitted on all downstream communication channels.

Upon initialization 602 of gateway 300, network interface 302 of gateway 300 tunes to a valid downstream communication channel (as described above) and receives the UCDs sent by the CMTS on the tuned downstream communication channel, in step 604. It is to be appreciated that the received UCDs are provided to CPU 304. In step 606, CPU 304 determines if all of the UCDs have been received based on the data in the UCDs, where, as stated above, each UCD includes data indicating the total number of UCDs that will be sent. If CPU 304 determines that all the UCDs have not been received, in step 606, gateway 300 continues to gather UCDs, in step 604. However, if CPU 304 determines that all the UCDs have been received, in step 606, CPU 304 determines the operational frequency for the upstream channel associated with each received UCD, in step 608.

A portion of the information present in an exemplary UCD is shown below:
DOCSIS Standard UCD Message:
MMM Type: UCD
Upstream Channel ID (HEX)=01
Config. Change Count=3
Mini-Slot Size=64
Downstream Channel ID (HEX)=0B
Symbol Rate=1 (160000 symbols/sec)
Upstream Frequency=26750000 Hz As seen above in the exemplary UCD information, UCD's include the symbol rate and the "upstream frequency" of the upstream channel associated with the UCD, where the "upstream frequency" in the UCD information represents the center frequency of the upstream channel. In one embodiment, when CPU 304 receives a UCD associated with an upstream channel, CPU 304 determines the operational frequency of the upstream channel associated with the UCD based on the center frequency of the upstream channel and the channel bandwidth. The symbol rate information may be used by CPU 304 to determine a maximum or uppermost frequency of operation for the upstream channel associated with the UCD, For example, 5,120 Mega symbols per second (hsps) occupies 6.4 MHz Channel Bandwidth (25% excess bandwidth for upstream), 160 Ksps occupies 200 KHz channel bandwidth. A general formula is to multiply the symbol rate found in the UCD for the upstream channel associated with the UCD by 1.25 to get the occupied channel bandwidth for the upstream channel. Once the upstream channel bandwidth has been calculated, the operational frequency of the upstream channel associated with the UCD can be calculated by CPU 304 by adding one-half of the occupied channel bandwidth to the center frequency. In other words, the operational frequency for each channel is determined by the following formula:

Operational Frequency=(0.5)*(Channel Bandwidth)+ (Center Frequency)

where, Channel Bandwidth=(1.25)*(Symbol Rate)

In step 608, CPU 304 may determine the operational frequency of the upstream channel corresponding to each received UCD in the manner described above using the symbol rate and the center frequency included in each received UCD. Then, in step 610, CPU 304 may determine the uppermost or maximum operational frequency of all the UCDs received (i.e., the highest frequency determined in step 608).

In step 612, CPU 304 may determine if the uppermost operational frequency is greater than a first value, where, in one embodiment, the first value is 42 MHz. If CPU 304 determines that the uppermost operational frequency is not greater than a first value (e.g., in one embodiment, 42 MHz), in step 612, CPU 304 may adjust the filtering circuit in network interface 302 (shown in FIG. 5 and described above) to achieve a first filter arrangement, in step 614. As described above, the first filter arrangement is achieved when CPU 304 provides signals to switches 525, 550, and 555 to couple LPF 520 to DS HPF 530 and US LPF 535 (via output 526 of switch 525) and to couple DS HPF 530 to downstream circuitry in gateway 300 (via input 556 of switch 555) and US LPF 535 to upstream circuitry in gateway 300 (via input 551 of switch 550). In this way, signals above 54 MHz are provided to upstream circuitry in gateway 300 and signals below 42 MHz are provided to downstream circuitry in gateway 300 consistent with older DOCISIS protocols (i.e., protocols before DOCISIS 3.1).

Alternatively, if CPU 304 determines that the uppermost operational frequency is greater than a first value (e.g., in one embodiment, 42 MHz), in step 612, CPU 304 may adjust the filtering circuit in network interface 302 to achieve a second filter arrangement, in step 616. As described above, the second filter arrangement is achieved when CPU 304 provides signals to switches 525, 550, and 555 to couple LPF 520 to US LPF 540 and DS HPF 545 (via output 527 of switch 525) and to couple US LPF 540 to upstream circuitry in gateway 300 (via input 552 of switch 550) and DS HPF 545 to downstream circuitry in gateway 300 (via input 557 of switch 555). In this way, signals below 85 MHz are provided to upstream circuitry in gateway 300 and signals above 108 MHz are provided to downstream circuitry in gateway 300 consistent with DOCISIS 3.1 protocol.

After CPU 304 adjusts the filtering circuit in turner 302 to achieve a first filter arrangement, in step 614, or a second filter arrangement, in step 616, CPU 304 may initiate the ranging phase (described above), in step 618. It is to be appreciated that analysis and determination of proper filter configuration (steps 508-516) is completed prior to beginning ranging in step 618, A portion of software code for implementing process 600 in a controller, such as CPU 304, is shown below:

```
uint32 BcmCmMultiUsHelper::FindLargestUsFrequency( )
{
  uint32 frequency = 0; // frequency retrieved from UCD list
  if( !fCmUsTargetMset.empty( ) )
  {
    uint32 symbolRate = 0;        // upstream channel symbol rate
    BcmUpstreamSettings usSets; // upstream settings contains the
channel frequency
    CmUsTargetMsetConstIt it = fCmUsTargetMset.begin( ); //
upstream mset iterators
    CmUsTargetMsetConstIt it_end = fCmUsTargetMset.end( );
    while( it != it_end )
    {
      BcmCmUsTarget* ptarget = (BcmCmUsTarget*) (&(*it)); // get
the upstream target
      usSets = ptarget->UsSets( ); // get
the upstream settings
      if (usSets.FrequencyHz( ) > frequency)
      {
         frequency = usSets.FrequencyHz( ); // we only want the
max frequency of upstream channels
         symbolRate = 1000 * usSets.SymbolRateKSymPerSec( );
      }
      ++it; // try next us target.
    }
    // Add 1/2 the channel bandwidth to the center frequency
    // total bandwidth is 1.25 * symbol rate
    // This is the number that needs checked to the filter cutoff
frequency
    frequency += (symbolRate + (symbolRate / 4)) / 2;
  }
```

It is to be appreciated that in another embodiment of the present disclosure, an additional test condition can be used with filter circuit 500 and method 600 to determine the proper upstream communication frequency range being used in a network configuration. It is to be appreciated that the additional test condition may be implemented between step 610 and 612, or alternatively in parallel with step 612. When implementing the additional test condition, CPU 304 transmits a message (via network interface 302) in the upper (non-legacy) upstream band (i.e., 42-85 MHz frequency range) to the CMTS to determine if the upstream channel in that frequency range is used by the CMTS. In one embodiment, the message is transmitted in the upper band channel. The CPU 304 then waits to receive a response or acknowledgment from the CMTS indicating that the upstream channel is used for upstream communication. Failure to receive a response from the CMTS acknowledging the message sent by CPU 304 indicates that the upstream channel at that frequency, while "available", is not used by the CMTS. The failure to use or not acknowledge the upstream channel at that frequency may provide an indication that frequencies in this frequency range are actually operating as part of the downstream portion of the frequency and interference with network communication can occur if upstream transmissions are carried out on this channel. CPU 304 is configured to select the first filter arrangement if no response acknowledging the message sent by CPU 304 is received in order to prevent potential interference with downstream communications in the network. Furthermore, CPU 304 is configured to select the second filter arrangement if a response acknowledging the message sent by CPU 304 is received.

In one embodiment, a method is provided. The method may be used for adjusting a filter response in a filter circuit. The method may be implemented by a communication device including receiving a signal, the signal including an indication of a plurality of channels used to transmit upstream communication signals in an upstream communication portion of a frequency range, determining a maximum value for a frequency used by the plurality of channels based on the indication, and adjusting a filter response in a filter circuit used to separate the upstream communication signals from downstream communication signals in a communication device based on the determined maximum frequency.

In another embodiment, the indication is received in a downstream communication portion of the frequency range during an initialization of the communication device.

In a further embodiment, the determining includes determining a center frequency and a channel bandwidth for at least one channel in the plurality of channels based on the indication.

In another embodiment, the indication is a plurality of upstream channel descriptors, each upstream channel descriptor corresponding to a channel of the plurality of channels and each upstream channel descriptor including data identifying a center frequency for the channel associated with the upstream channel descriptor and a symbol rate for the communication protocol for the channel.

In a further embodiment, the channel bandwidth for each channel of the plurality of channels is determined based on the symbol rate in the upstream channel descriptor of the corresponding channel.

In another embodiment, the channel bandwidth is determined by multiplying the symbol rate by an upstream excess bandwidth factor. For example, the upstream excess bandwidth factor may be equal to 1.25.

In a further embodiment, an operational frequency for each channel of the plurality of channels is determined by adding the center frequency for each channel to half of the determined channel bandwidth for the corresponding channel.

In another embodiment, the maximum value is determined by determining the highest operational frequency for all of the channels of the plurality of channels.

In a further embodiment, the method provided further includes determining if the maximum value is greater than a first value, where the adjusting includes switching to a first filter arrangement if the maximum value is not greater than the first value and switching to a second filter arrangement if the maximum value is greater than a first value. The first filter arrangement and the second filter operate to filter different ranges of frequencies, with the first filter arrangement including a first highpass filter and a first lowpass filter and the second filter arrangement including a second highpass filter and a second lowpass filter.

In another embodiment, the upstream communication portion is limited to a first frequency range or a second frequency range and the second frequency range includes the first frequency range and has a higher upper frequency limit than the first frequency range and the downstream communication portion is limited to a third frequency range or a forth frequency range, the first lowpass filter only passing signals in the first frequency range and first highpass filter only passing signals in the third frequency range, the second lowpass filter only passing signals in the second frequency range and the second highpass filter only passing signals in the fourth frequency range.

In a further embodiment, the method provided further includes transmitting a signal using a frequency for one of the plurality of channels that is a frequency in a portion of the second frequency range that is higher than the first frequency range, determining if an acknowledgement is received on a signal received in the first frequency range, switching to the first filter arrangement if it is determined that the acknowledgement is not received, and switching to the second filter arrangement if it is determined that the acknowledgement is received.

In one embodiment, an apparatus is provided a network interface coupled to a network, the network interface including a filter circuit that separates signals communicated between the network and the apparatus in an upstream communication portion of a frequency range from signals communicated between the network and the apparatus in a downstream communication portion of the frequency range, the network interface further receiving a signal communicated over the network in the downstream communication portion of the frequency range, the signal including an indication of a plurality of channels used to transmit upstream communication signals in the upstream communication portion of a frequency range, and a processing circuit coupled to the network interface, the processing circuit determining a maximum value for a frequency used by the plurality of channels in the upstream communication portion of the frequency range based on the indication in the received signal and adjusting a filter response in the filter circuit based on the determined maximum frequency, In another embodiment, the indication is received by the network interface in a downstream communication portion of the frequency range during an initialization of the apparatus.

In a further embodiment, the processor determines a center frequency and a channel bandwidth for at least one channel in the plurality of channels based on the indication.

In another embodiment, the indication is a plurality of upstream channel descriptors, each upstream channel descriptor corresponding to a channel of the plurality of channels and each upstream channel descriptor including data identifying a center frequency for the channel associated with the upstream channel descriptor and a symbol rate for the communication protocol for the channel.

In a further embodiment, the processor determines the channel bandwidth for each channel of the plurality of channels based on the symbol rate in the upstream descriptor of the corresponding channel.

In another embodiment, the processor determines the channel bandwidth by multiplying the symbol rate by 1.25.

In a further embodiment, the processor determines an operational frequency for each channel in the plurality of channels by adding the center frequency for the corresponding channel to half of the determined channel bandwidth for the corresponding channel.

In another embodiment, the processor determines the maximum value by determining the highest operational frequency for all of the channels of the plurality of channels.

In a further embodiment, the apparatus provided includes a filter with a first filter arrangement comprising a first highpass filter and a first lowpass filter and a second filter arrangement comprising a second highpass filter and a second lowpass filter. The processor further determines if the maximum value is greater than a first value and adjusts the filter response by switching to a first filter arrangement if the maximum value is not greater than a first value and switching to a second filter arrangement if the maximum value is greater than a first value.

In another embodiment, the upstream communication portion of the frequency range is limited to a first frequency range or a second frequency range and the downstream communication portion of the frequency range is limited to a third frequency range or a forth frequency range, the second frequency range includes the first frequency range and has a higher upper frequency limit than the first frequency range, the third frequency range is above the first frequency range and the fourth frequency range is above the third frequency range, the first lowpass filter only passes signals in the first frequency range and the first highpass filter only passes signals in the third frequency range, the second lowpass filter only passes signals in the second frequency range and the second highpass filter only passes signals in the fourth frequency range.

In a further embodiment, the processor transmits a signal via the network interface using a frequency for one of the plurality of channels that is a frequency in a portion of the second frequency range that is higher than the first frequency range, determines if an acknowledgement is received on a signal received in the first frequency range, switches to the first filter arrangement if it is determined that the acknowledgement is not received, and switches to the second filter arrangement if it is determined that the acknowledgement is received.

It is to be appreciated that, except where explicitly indicated in the description above, the various features shown and described are interchangeable, that is, a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments of a method and apparatus for controlling a filter circuit in a signal communication device, it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method comprising:
receiving an indication of a plurality of channels used to transmit upstream communication signals in an upstream communication portion of a frequency range;
determining a maximum frequency value among frequencies specified by the plurality of channels based on the indication;
adjusting a filter response in a filter circuit used to separate the upstream communication signals from downstream communication signals in a communication device based on the determined maximum frequency value; and
determining if the maximum frequency value is greater than a first value, wherein the adjusting includes switching to a first filter arrangement if the maximum frequency value is not greater than the first value and switching to a second filter arrangement if the maximum frequency value is greater than a first value, wherein the first filter arrangement includes a first highpass filter and a first lowpass filter and the second filter arrangement includes a second highpass filter and a second lowpass filter.

2. The method of claim 1, wherein the indication is received in a downstream communication portion of the frequency range.

3. The method of claim 1, wherein determining a maximum frequency value among frequencies specified by the plurality of channels based on the indication includes determining a center frequency and a channel bandwidth for at least one channel in the plurality of channels based on the indication.

4. The method of claim 3, wherein the indication is a plurality of upstream channel descriptors, each upstream channel descriptor corresponding to a channel of the plurality of channels and each upstream channel descriptor including data identifying a center frequency for the channel associated with the upstream channel descriptor and a symbol rate for a communication protocol for the channel.

5. The method of claim 4, wherein the channel bandwidth for each channel of the plurality of channels is determined based on the symbol rate in the upstream channel descriptor of the corresponding channel.

6. The method of claim 5, wherein an operational frequency for each channel of the plurality of channels is determined by adding the center frequency for each channel to half of the determined channel bandwidth for the corresponding channel.

7. The method of claim 6, wherein the maximum frequency value is determined by determining a highest operational frequency for all of the channels of the plurality of channels.

8. The method of claim 1, wherein the upstream communication portion is limited to a first frequency range or a second frequency range and the second frequency range includes the first frequency range and has a higher upper frequency limit than the first frequency range and a downstream communication portion is limited to a third frequency range or a fourth frequency range, the first lowpass filter only passing signals in the first frequency range and first highpass filter only passing signals in the third frequency range, the second lowpass filter only passing signals in the second frequency range and the second highpass filter only passing signals in the fourth frequency range.

9. The method of claim 8, further comprising:
transmitting a signal using a frequency for one of the plurality of channels that is a frequency in a portion of the second frequency range that is higher than the first frequency range; determining if an acknowledgement is received on a signal received in the first frequency range; switching to the first filter arrangement if it is determined that the acknowledgement is not received; and
switching to the second filter arrangement if it is determined that the acknowledgement is received.

10. An apparatus comprising:
a network interface coupled to a network, the network interface including a filter circuit that separates signals communicated between the network and the apparatus in an upstream communication portion of a frequency range from signals communicated between the network and the apparatus in a downstream communication portion of the frequency range, the network interface further receiving an indication of a plurality of channels used to transmit upstream communication signals in the upstream communication portion of a frequency range;

a processing circuit coupled to the network interface, the processing circuit determining a maximum frequency value among frequencies specified by the plurality of channels in the upstream communication portion of the frequency range based on the indication in a received signal and adjusting a filter response in the filter circuit based on the determined maximum frequency value; and wherein the filter further includes a first filter arrangement comprising a first highpass filter and a first lowpass filter and a second filter arrangement comprising a second highpass filter and a second lowpass filter, wherein the processing circuit determines if the maximum frequency value is greater than a first value and adjusts the filter response by switching to a first filter arrangement if the maximum frequency value is not greater than a first value and switching to a second filter arrangement if the maximum frequency value is greater than a first value.

11. The apparatus of claim 10, wherein the indication is received by the network interface in the downstream communication portion of the frequency range.

12. The apparatus of claim 10, wherein the processor determines a center frequency and a channel bandwidth for at least one channel in the plurality of channels based on the indication.

13. The apparatus of claim 12, wherein the indication is a plurality of upstream channel descriptors, each upstream channel descriptor corresponding to a channel of the plurality of channels and each upstream channel descriptor including data identifying a center frequency for the channel associated with the upstream channel descriptor and a symbol rate for a communication protocol for the channel.

14. The apparatus of claim 13, wherein the processor determines the channel bandwidth for each channel of the plurality of channels based on the symbol rate in the upstream descriptor of the corresponding channel.

15. The apparatus of claim 14, wherein the processor determines an operational frequency for each channel in the plurality of channels by adding the center frequency for the corresponding channel to half of the determined channel bandwidth for the corresponding channel.

16. The apparatus of claim 15, wherein the processor determines the maximum frequency value by determining a highest operational frequency for all of the channels of the plurality of channels.

17. The apparatus of claim 10, wherein the upstream communication portion of the frequency range is limited to a first frequency range or a second frequency range and the downstream communication portion of the frequency range is limited to a third frequency range or a fourth frequency range, the second frequency range includes the first frequency range and has a higher upper frequency limit than the first frequency range, the third frequency range is above the first frequency range and the fourth frequency range is above the third frequency range, the first lowpass filter only passes signals in the first frequency range and the first highpass filter only passes signals in the third frequency range, the second lowpass filter only passes signals in the second frequency range and the second highpass filter only passes signals in the fourth frequency range.

18. The apparatus of claim 17, wherein the processor:
transmits a signal via the network interface using a frequency for one of the plurality of channels that is a frequency in a portion of the second frequency range that is higher than the first frequency range;
determines if an acknowledgement is received on a signal received in the first frequency range;
switches to the first filter arrangement if it is determined that the acknowledgement is not received; and
switches to the second filter arrangement if it is determined that the acknowledgement is received.

* * * * *